(12) United States Patent
Michael et al.

(10) Patent No.: US 11,450,064 B2
(45) Date of Patent: Sep. 20, 2022

(54) GAUSSIAN MIXTURE MODEL BASED APPROXIMATION OF CONTINUOUS BELIEF DISTRIBUTIONS

(71) Applicant: CARNEGIE MELLON UNIVERSITY, Pittsburgh, PA (US)

(72) Inventors: Nathan Michael, Pittsburgh, PA (US); Shobhit Srivastava, San Diego, CA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 532 days.

(21) Appl. No.: 16/330,411

(22) PCT Filed: Aug. 31, 2017

(86) PCT No.: PCT/US2017/049524
§ 371 (c)(1),
(2) Date: Mar. 5, 2019

(87) PCT Pub. No.: WO2018/048704
PCT Pub. Date: Mar. 15, 2018

(65) Prior Publication Data
US 2021/0279955 A1    Sep. 9, 2021

Related U.S. Application Data

(60) Provisional application No. 62/495,209, filed on Sep. 6, 2016.

(51) Int. Cl.
*G06T 17/20* (2006.01)
*G06T 17/10* (2006.01)
*G06K 9/62* (2022.01)
*G06N 7/00* (2006.01)

(52) U.S. Cl.
CPC ............ *G06T 17/20* (2013.01); *G06K 9/6215* (2013.01); *G06K 9/6288* (2013.01); *G06N 7/005* (2013.01)

(58) Field of Classification Search
CPC ........ G06T 17/20; G06T 17/10; G06K 9/6215
See application file for complete search history.

(56) References Cited

U.S. PATENT DOCUMENTS

| | | | |
|---|---|---|---|
| 2005/0131869 A1* | 6/2005 | Xie | ..................... G06F 16/7864 |
| 2006/0291580 A1 | 12/2006 | Horvitz | |
| 2010/0104018 A1* | 4/2010 | Bregler | .............. G06K 9/00342 375/240.16 |

(Continued)

OTHER PUBLICATIONS

International Search Report and Written Opinion for International Application No. PCT/US2017/049524, dated Nov. 16, 2017.

(Continued)

*Primary Examiner* — Yi Yang
(74) *Attorney, Agent, or Firm* — KDB Firm PLLC

(57) ABSTRACT

A system and method to generate perceptual models of the environment that optimally handle the variation in clutter and provide a multiresolution and multi-fidelity representation of the environment is described. The system and method is able to capture inherent structural dependencies, thereby allowing efficient and precise inferences to be drawn. The approach employs a hierarchy of Gaussian Mixtures to approximate the underlying spatial distribution.

17 Claims, 5 Drawing Sheets

(56) References Cited

U.S. PATENT DOCUMENTS

| | | |
|---|---|---|
| 2011/0058605 A1 | 3/2011 | Ma |
| 2012/0023148 A1 | 1/2012 | Long et al. |
| 2012/0274481 A1 | 11/2012 | Ginsberg et al. |
| 2013/0202217 A1* | 8/2013 | Pavlovich ............ G06K 9/6202 382/218 |
| 2013/0235927 A1* | 9/2013 | Win ...................... H04N 19/43 375/240.02 |
| 2014/0323897 A1 | 10/2014 | Brown et al. |
| 2015/0009214 A1* | 1/2015 | Lee ........................ G06T 17/20 345/420 |
| 2015/0084951 A1 | 3/2015 | Boivin et al. |
| 2015/0325038 A1* | 11/2015 | Baker ................ G06Q 30/0643 345/426 |
| 2017/0249401 A1* | 8/2017 | Eckart .................... G06F 17/18 |

OTHER PUBLICATIONS

Eckart, B., et al., "Accelerated Generative Models for 3D Point Cloud Data," The Robotics Institute, IEEE Conference on Computer Vision and Pattern Recognition (CVPR), Jun. 1, 2016. Retrieved from the Internet URL: https://research.nividia.com/publication/accelerated-generative-models.

\* cited by examiner

Algorithm 1 Local HGMM Generation

---
Result: Local HGMM $\mathcal{L}$
$\lambda_d, \lambda_t, Z \leftarrow Input;$
$\mathcal{L} \leftarrow \{\emptyset\};$
$\lambda_f \leftarrow OverEstimate();$
$div \leftarrow 0, l \leftarrow 0;$
$\mathcal{L}_l \leftarrow TrainGMM(Z, \lambda_f);$
while *true* do
    $\mathcal{L}_{l+1} \leftarrow \mathcal{L}_l;$
    for $i \leftarrow 1...|\mathcal{L}_{l+1}|$ do
        $\theta_i, w_i \leftarrow \mathcal{L}_{l+1,i};$
        for $j \leftarrow i+1...|\mathcal{L}_{l+1}|$ do
            $\theta_j, w_j \leftarrow \mathcal{L}_{l+1,j};$
            if $KLDivergence(\theta_i, \theta_j) < \lambda_d$ then
                $\theta_i \leftarrow Merge(\theta_i, \theta_j);$
                $w_i \leftarrow w_i + w_j;$
            end
        end
        $\mathcal{L}_l \leftarrow \mathcal{L}_l \cup \{\theta_i, w_i\};$
    end
    $div \leftarrow KLDivergence(\mathcal{L}_l, \mathcal{L}_{l+1});$
    if $\neg Pruned\ AND\ IsKneePoint(div)$ then
        $Prune(\mathcal{L}, l+2);$
        $\lambda_f \leftarrow |\mathcal{L}_{l+1}|;$
    end
    if $|\mathcal{L}_l| < \lambda_t$ then
        break;
    end
end

Algorithm 2 Global HGMM Incremental Update

---
Result: Global HGMM $\mathcal{G}$ $\mathcal{G}, \mathcal{L}, N_{\mathcal{G}}, N_{\mathcal{L}} \leftarrow Input;$
$l_{\mathcal{G}} \leftarrow |\mathcal{G}|;$
$l_{\mathcal{L}} \leftarrow |\mathcal{L}|;$
while *true* do
    $\mathcal{G}_{l_{\mathcal{G}}} \leftarrow \mathcal{G}_{l_{\mathcal{G}}} \cup \mathcal{L}_{l_{\mathcal{L}}};$
    $w_{l_{\mathcal{G}}} \leftarrow UpdateWeight(N_{\mathcal{G}}, N_{\mathcal{L}}, w_{l_{\mathcal{G}}});$
    $w_{l_{\mathcal{L}}} \leftarrow UpdateWeight(N_{\mathcal{G}}, N_{\mathcal{L}}, w_{l_{\mathcal{L}}});$
    $l_{\mathcal{G}} \leftarrow l_{\mathcal{G}} - 1;$
    $l_{\mathcal{L}} \leftarrow l_{\mathcal{L}} - 1;$
    if $l_{\mathcal{G}} = 0$ *OR* $l_{\mathcal{L}} = 0$ then
        | break;
    end
end

GAUSSIAN MIXTURE MODEL BASED APPROXIMATION OF CONTINUOUS BELIEF DISTRIBUTIONS

RELATED APPLICATIONS

This application is a national phase filing under 35 U.S.C. § 371 claiming the benefit of and priority to International Patent Application No. PCT/US2017/049524, filed on Aug. 31, 2017, which claims the benefit of U.S. Provisional Patent Application No. 62/495,209, filed Sep. 6, 2016. The entire contents of these applications are incorporated herein by reference.

GOVERNMENT INTEREST

This invention was made with government support under W911NF-08-2-0004 awarded by the Army/ARO. The government has certain rights in the invention.

TECHNICAL FIELD

Embodiments herein generally relate to the field of autonomous vehicles, and, more particularly, to vehicles capable of mapping the environment for use in navigation.

BACKGROUND OF THE INVENTION

Precise infrastructure inspection forms an integral part of a variety of applications ranging from assessment of structural deterioration for bridges and roof-tops to monitoring the system state in potentially unsafe environments, such as power plants. Such inspection tasks may prove to be hazardous for those involved, which underlines the need for autonomous inspection. To be able to match the precision and surpass the efficiency of a manual inspector, a high-fidelity perceptual model of the operating environment is essential. Further, for the model to be effective, it may be necessary to generate and update the model in real-time. This model can then be used to generate maps for navigation or to obtain high-fidelity reconstructions for the purpose of inspection. Such a model serves as a representation of the system's belief regarding the environment and directly impacts the accuracy of inspection. A key characteristic of target environments that can be leveraged for generating compact models is the presence of structural dependencies. A model that is able to capture and exploit these inherent correlations can scale to large environments. Further, a representation that models the information in the environment can optimally handle varying degree of clutter.

Traditionally, occupancy grids have been used to create models for this purpose. Occupancy grids discretize the world into fixed size cells called voxels. The state of each voxel, occupied or unoccupied, is updated independently from the sensor observations that fall in or pass through it. Each voxel, in this approach, is updated independently and thus fails to capture spatial dependencies and correlations inherent in the environment. This makes the model vulnerable to sensor noise and leads to holes in the distribution. The size of a voxel, and thus the model's resolution, has to be pre-defined, which makes it computationally inefficient in environments with varying amounts of detail. Octomaps, through the on-demand sub-division of voxels, serve to make voxel grids efficient and provide a multi-resolution representation, but are still vulnerable to sensor noise.

A normal distributions transform (NDT) occupancy map provides a probabilistic representation by learning a decoupled Gaussian distribution per voxel. However, the cell independence assumption, which induces decoupling of Gaussians, leads to low representation fidelity at cell boundaries, as shown in FIG. 1(b). In contrast, the proposed approach learns a continuous distribution over space and is thus able to support arbitrary resolution representations.

Other techniques to generate continuous representations of the environment include Gaussian Process occupancy maps and Hilbert maps the. Gaussian Process regression is a powerful framework for modelling surfaces as functions drawn from a Gaussian distribution. However, the complexity of querying a Gaussian process grows cubically with the size of the input, which makes it intractable for direct application to large dense point clouds. Other strategies to discretize the environment into small regions based on the characteristic length-scale of the covariance function and train local Gaussian Processes in these regions have been proposed. However, online training of hyper-parameters for large point clouds still poses a challenge and a single set of parameters trained offline may not be applicable for different regions in an environment with varying degrees of clutter.

Bayesian Committee Machines have also been proposed for updating the representation, but this approach restricts the model to a single fixed resolution and requires caching of mean and variance for each cell in the grid, thus making it memory intensive. Hilbert maps learn a logistic regression classifier on input data projected into Hilbert space. However, incrementally merging locally learned logistic regression classifiers requires discretization of space, thus sacrificing arbitrary resolution capability of the technique.

SUMMARY OF THE INVENTION

The system and method described herein seeks to achieve high fidelity by constructing a hierarchy of Gaussian Mixture Models (GMM) with increasing fidelity lower in the hierarchy. The innate ability of the model to capture structural dependencies makes it compact and efficient to infer upon.

In contrast to an NDT occupancy map, the system and method described herein learns a continuous distribution over space and is thus able to support arbitrary resolution representations. Unlike Hilbert maps, the system and method supports arbitrary resolution representations and can be incrementally updated. Also, the parameters required are less dependent on the environment and easy to tune.

The method is capable of estimating the optimal size of the model for a high-fidelity representation via information theoretic principles. Further, the method can be described by a relatively small number of parameters, making it memory efficient. The use of Gaussian mixture models allows the storage of the equivalent of a point-cloud data set using Gaussian distributions expressed by their basic parameters. This allows the equivalent of a point cloud data set to be effectively compressed and stored using a much smaller amount of memory than storing the point-cloud data and.

FIG. 1 shows that the described system and method permits reasoning with respect to the environment without assuming a fixed resolution enabling high-fidelity representation. In contrast, FIG. 1(a) shows that the NDT-OM representation which has 372 decoupled Gaussians, results in the reconstructed point-cloud with gaps. FIG. 1(b) shows a zoomed in view of the NDT-OM representation FIG. 1(a). The system and method described herein results in a representation with 137 coupled Gaussians, as shown in FIG. 1(c), which provides a higher-fidelity reconstruction, as shown in FIG. 1(d).

DESCRIPTION OF THE DRAWINGS

FIG. 4 shows an algorithm for the generation an update of the local HGMM.

FIG. 5 shows an algorithm for the incremental update of the global HGMM.

DETAILED DESCRIPTION

Figure 1A:
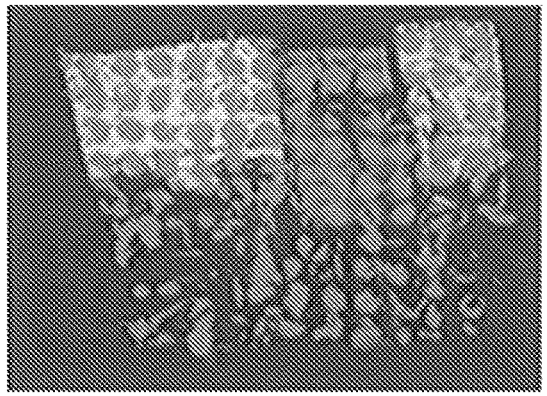
FIG. 1 shows a comparison of the system and methods described herein versus a representation using NDT-OM.
Figure 1B:
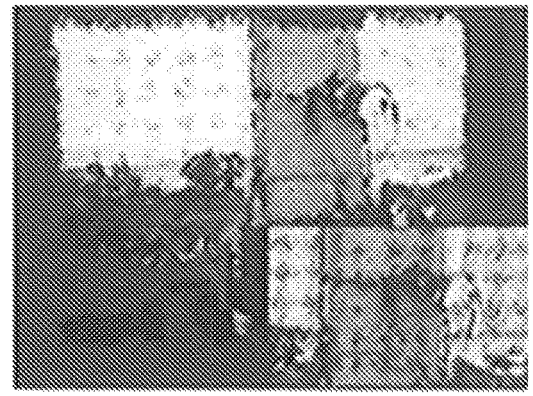
Figure 1C:
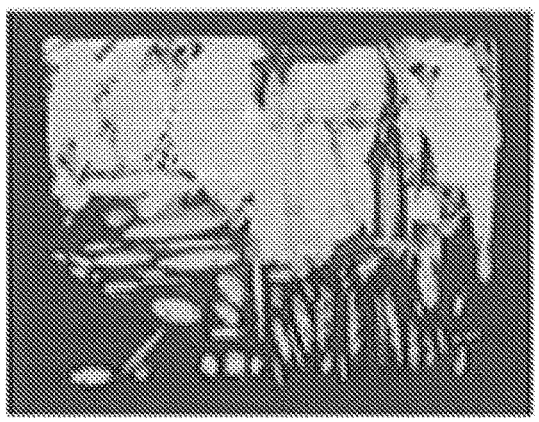
Figure 1D:

The system and method described herein uses an adaptive hierarchical approach that enables local online environment modeling as an approximate continuous belief distribution encoded as a GMM. GMMs are a known mathematical approach to model multimodal distributions. The introduction of a hierarchical approach adapts representation fidelity/resolution based on information content that enables online application in a robotics context. The insight to introduce adaptive hierarchy is a novel aspect of the invention that enables real-time operation, thus enabling application to autonomous systems. Further, the small memory footprint of the GMM along with a principled generation of local and global models enables online development of consistent models that scale in size to potentially large environments. Also, incorporation of information from multiple sensing modalities makes the representation robust to sensor malfunction via efficient inference of one modality based on others.

Gaussian Mixture Model

A Gaussian Mixture model (GMM) is a very powerful tool to model multimodal probability distributions. It is a suitable representation for autonomous inspection due to the relatively smaller number of parameters involved and due to its ability to model multimodal distributions with unknown parametric forms.

Formally, given a point cloud Z of size N, a Gaussian Mixture model with J components is specified by its component parameters $\theta_j = (\pi_j, \mu_j, \Sigma_j)$ where $\pi_j$, $\mu_j$ and $\Sigma_j$ are the prior, mean and covariance matrix for the j-th component. The probability of the point-cloud to be generated by this Gaussian Mixture Model is given as $$p(Z \mid \theta) = \prod_{i=1}^{N} p(z_i \mid \theta) \quad (1)$$

$$= \prod_{i=1}^{N} \sum_{j=1}^{J} \pi_j p(z_i \mid \theta_j) \quad (2)$$

where $$p(z_i \mid \theta_j) = \mathcal{N}(z_i \mid \theta_j) \quad (3)$$

and the corresponding log-likelihood of the data is $$\ln p(Z \mid \theta) = \sum_{i=1}^{N} \ln \sum_{j=1}^{J} \pi_j p(z_i \mid \theta_j) \quad (4)$$

An Expectation-Maximization approach is used to learn the parameters of the model. This approach introduces a set of correspondence variables C such that $c_{i,j}$ represents the binary association between points $z_i \in Z$ and components $\theta_j$. The log-likelihood with the correspondence variables incorporated is $$\ln p(Z, C \mid \theta) = \sum_{i=1}^{N} \sum_{j=1}^{J} c_{ij} \{ \ln \pi_j + \ln p(z_i \mid \theta_j) \}$$

The algorithm then iteratively calculates the expected value of the correspondence variables based on the current parameters of the system in the E-step and updates the parameters by maximizing the log-likelihood in the M-step. The complexity of training a GMM is O(K N J) where K is the number of iterations the algorithm takes to converge.

Divergence Between Mixtures of Gaussians

Divergence measures seek to provide a measure of distance or dissimilarity between two probability distribution functions (PDFs). Here, the divergence measure between two Gaussian distributions and the divergence measure between two GMMs are significant. The closed form solution for Kullback-Leibler (KL) divergence between two Gaussian distributions $f = \mathcal{N}(\mu_f, \Sigma_f)$ and $g = \mathcal{N}(\mu_g, \Sigma_g)$ for D-dimensional data is given as $$KL(f \| g) = \frac{1}{2} \left( \log \frac{|\Sigma_g|}{|\Sigma_f|} + \mathrm{trace}\left(\sum_{g}^{-1} \sum_{f}\right) + (\mu_f - \mu_g)^T \sum_{g}^{-1} (\mu_f - \mu_g) - D \right) \quad (5)$$

A closed form solution for KL-divergence between two Gaussian mixtures is not known. However, an approximation has been derived and is reproduced here. For two GMMs, p and q with M and K components respectively and parameters $(\pi_m, \mu_m, \Lambda_m)$ and $(\tau_k, \upsilon_k, \Omega_k)$, it is given as $$D_{KL}(q, p) = \sum_{i=1}^{M} \pi_i \min_j \left( KL(p_i \| q_j) + \log \frac{\pi_i}{\tau_j} \right) \quad (6)$$

Fidelity Threshold and Divergence

The divergence measure can be used to derive an estimate of the relative expressive capability of GMMs trained on given data. This quantification of expressive capability enables the estimation of the optimal size of the mixture for the target environment. The key idea is that even though real world data is inherently non-Gaussian, there is a threshold on the size of the mixture model beyond which the fidelity of the model does not vary significantly even if more components are added. We refer to this optimal size of the mixture as the fidelity-threshold ($\lambda_f$).

Figure 2:
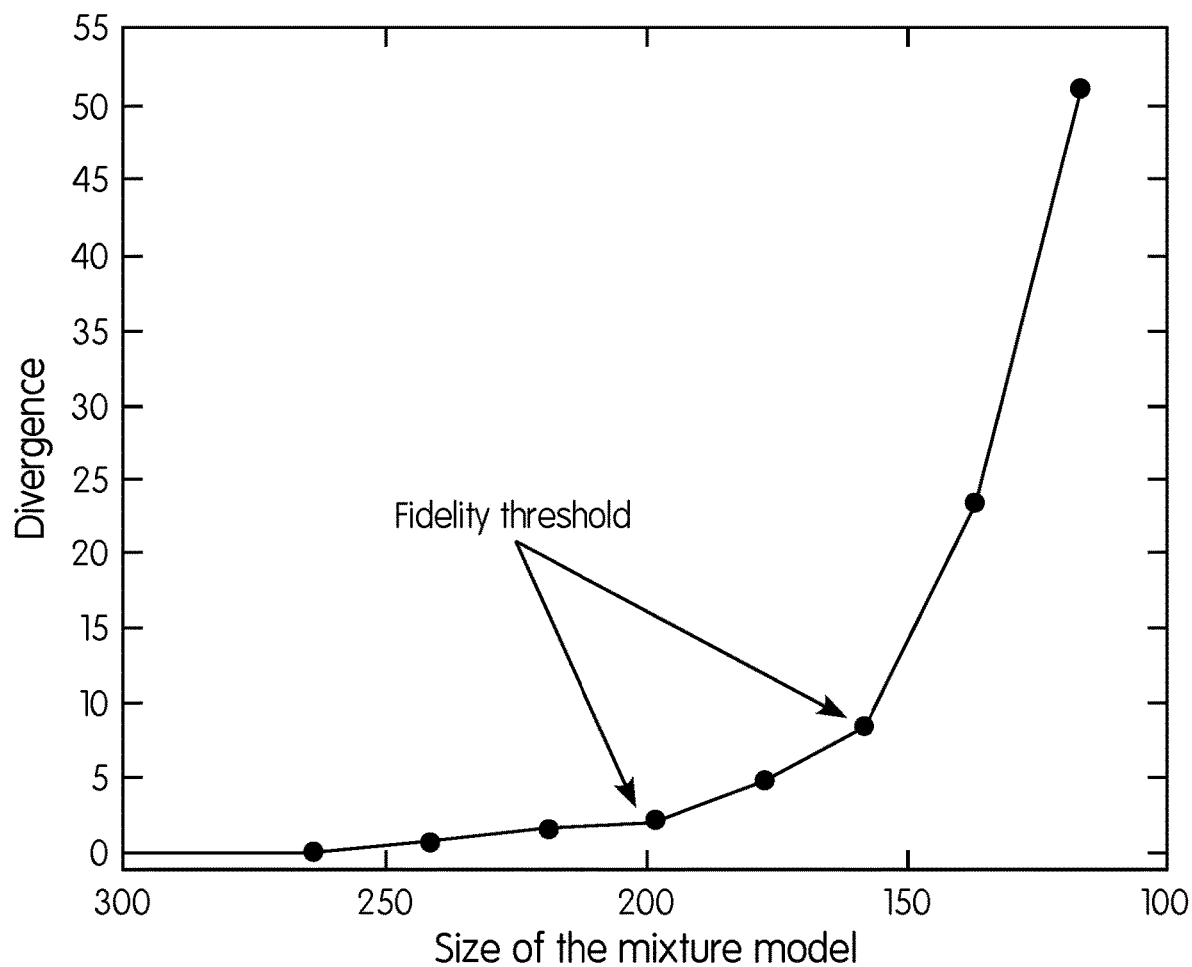
FIG. 2 shows a graph of divergence plotted against the size of the mixture model, which shows that the point beyond which the fidelity of the model does not vary significantly even if more components are added.

FIG. 2 is a graph showing the variation of KL-diversions for GMMs of size varying from 300 to 116, with respect to the largest GMM of size 300. The possible fidelity thresholds are highlighted. Increasing the size of the GMM beyond these thresholds does not significantly affect the fidelity of the representation as indicated by the small decrease in divergence.

Methodology

Figure 3:
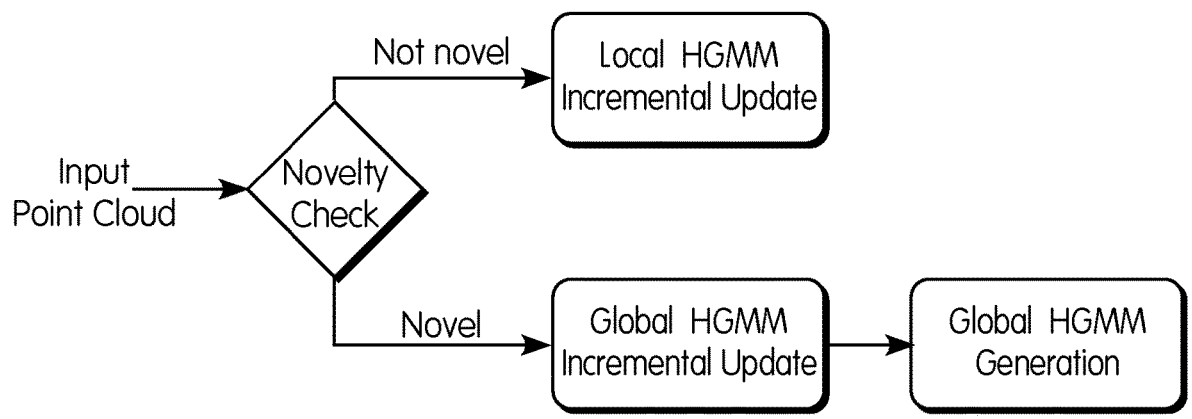
FIG. 3 shows a high-level view of the methodology for the generation and update of the proposed Hierarchical Gaussian Mixture Model (HGMM).

FIG. 3 shows a high-level view of the methodology for the generation and update of the proposed Hierarchical Gaussian Mixture Model (HGMM). The model is divided into a local component that represents the region the system is currently observing and a global component which is the model for places the system has already visited. The input point-cloud Z is tested for the novelty of the information that it provides. If significantly novel, a local HGMM, $\mathcal{L}$, is instantiated after merging the current local HGMM with the global HGMM, $\mathcal{G}$. Otherwise, the current local HGMM is incrementally updated. The details of the methodology follow.

Local HGMM Generation

FIG. 4 shows Algorithm 1, which is the bottom-up algorithm used to learn a hierarchy of GMMs over the input point-cloud. The algorithm requires a similarity threshold $\lambda_d$ and the point-cloud Z as input. The lowest level is trained using a standard expectation-maximization (EM) approach. The higher levels of the hierarchy are generated by merging similar components where two components are considered to be similar if their KL-Divergence, given by equation (5), is within $\lambda_d$. The KL-Divergence of the current level with the lowest level, given by equation (6), is used to estimate the knee point and thus the fidelity-threshold. Once estimated, all levels of the hierarchy with size more than $\lambda_f$ are pruned. The process continues by building higher levels of the hierarchy (with lesser fidelity). The algorithm is terminated when the lowest desired fidelity GMM of size $\lambda_t$ (a user tunable parameter based on variation of divergence) has been generated.

The input parameter $\lambda_d$ regulates the rate of merging of Gaussian components to form higher layers of the hierarchy and can be determined by experimentation. The over-estimate of $\lambda_f$ affects the accuracy of the model if it is not a strict over-estimate. Conversely, a very large value affects the computational complexity of the algorithm. The strategy of the system and method involves applying a voxel-grid filter to the incoming point-cloud. The number of voxels occupied after the filtering is an over-estimate for $\lambda_f$. This technique is suitable for applications such as precise close-ranged inspection due to limited spatial extent of the input data.

Novelty Check

Once a local HGMM has been generated, the incoming point-cloud is tested for the novelty of its information content. To do this, the portion of the incoming point-cloud data that cannot be represented by the existing local GMM is estimated. A minimum likelihood or novelty threshold ($\lambda_n$) is defined as an empirically determined parameter. The likelihood that a point can be modelled by the existing HGMM is estimated by calculating the log likelihood using the GMM at the highest layer of the hierarchy. A point is considered to be novel if the likelihood is less than $\lambda_n$. If a significant portion of the incoming data is novel, a global HGMM update is triggered.

Local HGMM Incremental Update

A local HGMM is incrementally updated with the non-novel portion of the incoming data. The key is that for a static environment, the value of $\lambda_d$ for a particular region is not expected to vary with time. For updating the model, predictions for the non-novel portion of the data are obtained from the lowest level of the HGMM. For each point $z_i$, posterior probability of membership per component $\theta_j$ is obtained as follows $$p_{ij} = \frac{\pi_j p(x_i | \theta_j)}{\sum_{k=1}^{K} \pi_k p(x_i | \theta_k)} \quad (7)$$

A modified form of the maximization step of EM algorithm is used to update the parameters of the GMM. The standard maximization equations incrementally update the parameters of the mixture model for a point-cloud of size N in the $(k+)^{th}$ iteration as follows $$\mu_j^{k+1} = \frac{\sum_{i}^{N} \gamma_{ij} z_i}{\sum_{i}^{N} \gamma_{ij}} \quad (8)$$

$$\Sigma_j^{k+1} = \frac{\sum_{i}^{N} \gamma_{ij} z_i z_i^T}{\sum_{i}^{N} \gamma_{ij}} - \frac{\mu_j^{k+1} \mu_j^{k+1T}}{\sum_{i}^{N} \gamma_{ij}} \quad (9)$$

$$\pi_j^{k+1} = \sum_{i}^{N} \frac{\gamma_{ij}}{N}, \quad (10)$$

where $\gamma_{ij}$ is the expected value of the correspondence variable calculated in the E-step of the algorithm. Let the support set of the existing local GMM be N. Then for the component $\theta_j = (\pi_j, \mu_j, \Sigma_j)$, we have $$S_{\pi_j} = \sum_{i}^{N} \gamma_{ij} = N\pi_j$$

$$S_{\mu_j} = \sum_{i}^{N} \gamma_{ij} z_i = S_{\pi_j} \mu_j$$

$$S_{\Sigma_j} = \sum_{i}^{N} \gamma_{ij} z_i z_i^T = S_{\pi_j} \Sigma_j + \mu_j \mu_j^T$$

The updated mean, covariance and weights for the input point-cloud of size N' are then calculated as $$S'_{\pi_j} = S_{\pi_j} + \sum_{i}^{N'} p_{ij} \quad (11)$$

$$\pi'_j = \frac{S'_{\pi_j}}{N + N'} \quad (12)$$

$$\mu'_j = \frac{S_{\mu_j} + \sum_{i}^{N'} p_{ij} z_i}{S'_{\pi_j}} \quad (13)$$

$$\Sigma'_j = \frac{\left(S_{\Sigma_j} + \sum_{i}^{N'} p_{ij} z_i z_i^T\right) - \mu'_j \mu'^T_j}{S'_{\pi_j}} \quad (14)$$

The update is then propagated to the higher levels of the hierarchy by merging similar components as presented in Algorithm 1 in FIG. 4.

Global HGMM Incremental Update

FIG. 5 shows Algorithm 2, which is the global HGMM incremental update required when the incoming data is significantly novel. This update involves merging the current local HGMM with the global HGMM. The key is that the portion of the environment represented by the local HGMM cannot be modelled by the global HGMM. Thus, the update involves concatenation of corresponding levels of the two models with an adjustment of the weights. A weighted averaging scheme is adopted to scale the weights of the merged model. The updated weight $\pi_G$ for the global GMM with a support set of size $N_G$ is given as follows $$\pi_G = \frac{\pi_G N_G}{N_G + N_\mathcal{L}} \quad (15)$$

where $N_\mathcal{L}$ is the support size of the local GMM being merged.

Reconstruction of Point-Clouds

High fidelity reconstruction of the operating environment is of great significance for the task of precise inspection. To reconstruct a point-cloud using the system and method herein, a fixed number of samples are drawn from the probability distribution represented by the model. The fraction of samples to be drawn from each component is defined by the weight of the component in the mixture. Incremental reconstruction of point-clouds can also be done with the model by sampling incrementally from the current local HGMM.

Generation of a Metric Map from Continuous Distribution

The proposed approach learns a continuous belief distribution over the 3D space. However, a map in a metric form may be required for planning and navigation. To generate an occupancy grid, samples are drawn from the probability distribution as previously described. Sampling of points from each component ensures that the occupied space is covered and, as no points are drawn from free space, a relatively small set of points needs to be sampled to generate the occupancy grid. Once the points have been sampled, they are binned into voxels of the desired size, thus generating an occupancy grid.

Multimodal Belief Distribution

A homogeneous representation of information from multiple sensing modalities that allows efficient reasoning of the correlation between the modes of information enables absolute abstraction of the underlying sensor and its characteristics. Also, homogenization of information from multiple channels introduces robustness to sporadic loss of data resulting from sensor malfunction or adverse environment conditions. A multimodal representation enables a compact representation of the various properties of the operating environment, such as color, temperature, pressure, and texture, that, in turn, would enable numerous diverse robotic applications ranging from manipulation to active perception. A key challenge in modeling multimodal information is the dependence of computational complexity of any learning technique on the dimensionality of the data. This computational burden associated with training high-dimensional data renders online learning of a model practically infeasible. A multimodal model is, however, essential to enable reasoning over the correlation between different information modalities.

The system and method described herein can be expanded to enable efficient multi-fidelity, multimodal representation of the environment by training a set of J Hierarchical Gaussian Mixture Models (HGMMs) for J information modalities, instead of learning a single J-tuple HGMM. Employing a set of HGMMs is computationally feasible as the training for each model is independent of the others, enabling parallelization of the training procedure. However, learning independent models for each sensing modality precludes the ability to learn correlations between the information modalities. An approach to enable approximation of the correlation via inference based on prior observations is also described herein.

Let a location in space be represented by the random variable $X \in \mathbb{R}^3$. Let there be J modes of information available as input and the $i^{th}$ mode be given as $\Lambda_i$, $i \in \{1 \ldots J\}$. It is assumed that the data from different sensors is registered. This implies that, for instance, the R, G, and B values at each location in space observed by the range sensor is known. It is also assumed that the sensor observations for all information modalities are real-valued, ($\Lambda_i \in \mathbb{R}$).

The proposed multi-modal model consists of a set of Hierarchical Gaussian Mixture models, one per information modality. For each sensing modality, an HGMM to represent the joint density $p(X, \Lambda_i)$ is learned based on the input data. This results in J 4-tuple Hierarchical Gaussian Mixture Models. Considering the independence of the hierarchy generation on multimodal inference, the description going forward is based on the lowest level of the HGMM. Let the lowest level GMM corresponding to the $i^{th}$ modality contain K component Gaussian distributions specified by parameters, $\Theta_k = (\mu_k, \Sigma_k, \pi_k)$, where $\mu_k, \Sigma_k$ and $\pi_k$ represent the mean, covariance, and mixing weight for the $k^{th}$ component. Then, the $i^{th}$ model is expressed as $$p(X_i \Lambda_i) = \sum_{k=1}^{K} \pi_k \mathcal{N}\left(x, \lambda_i; \mu_k, \sum_k\right)$$

where $$\sum_{k=1}^{K} \pi_k = 1$$

$$\mu_k = \begin{bmatrix} \mu_{kX} \\ \mu_{k\Lambda_i} \end{bmatrix}$$

$$\sum_k = \begin{bmatrix} \sum_{kXX} & \sum_{kX\Lambda_i} \\ \sum_{k\Lambda_i X} & \sum_{k\Lambda_i \Lambda_i} \end{bmatrix}$$

The value of $\Lambda_i$ at any spatial location $X = x$ can be obtained as the expected value of $$p_{\Lambda_i | X}(\lambda | x) = \sum_{k=1}^{K} w_k(x) \phi(\lambda; m_k(x), \sigma_k^2),$$

with the mixing weight $$p_{\Lambda_i | X}(\lambda | x) = \sum_{k=1}^{K} w_k(x) \phi(\lambda; m_k(x), \sigma_k^2),$$

-continued and $$m_k(x) = \mu_{k\Lambda_i} + \sum_{k\Lambda_i X} \sum_{kXX}^{-1} (x - \mu_{kX})$$

$$\sigma_k^2 = \sum_{k\Lambda_i\Lambda_i} - \sum_{k\Lambda_i X} \sum_{kXX}^{-1} \sum_{kX\Lambda_i}$$

The expected value is given as $$m(x) = E[\Lambda_i \mid X = x] = \sum_{k=1}^{K} w_k(x) m_k(x)$$

and the associated variance estimate as $$v(x) = E[(\Lambda_i \mid X = x)^2] - E[\Lambda_i \mid X = x]^2$$

$$= \sum_{k=1}^{K} w_k(x)(m_k(x)^2 + \sigma_k^2) - \left(\sum_{k=1}^{K} w_k(x) m_k(x)\right)^2$$

Training

The training for each HGMM essentially follows the same procedure outlined in Algorithm 1 in FIG. 4 with the only difference being that a 4-tuple HGMM is learned instead of a 3D model. Registered point-cloud data and $\Lambda_i$ values are used for training the models. The training dataset consists of 4-tuple data-points of the form $\{X \in \mathbb{R}^3, \Lambda_i \in \mathbb{R}\}$. No augmentation via sampled data is required for training.

Cross-Modal Inference

The described system and method learns independent HGMMs for the input information modalities. This precludes the approach from learning the correlation between the modalities, which, in turn, disables querying for the value of one modality given the value of another. Correlation between input modalities enables inference of the value of a missing modality (for instance, due to sensor malfunction), given the values of the other modalities resulting in a robust environment representation. The proposed approach enables approximation, via inference, of the correlation between input modalities, thereby enabling a robust representation at a reduced computational cost.

Location-Based Priors

To enable inference of one modality based on another, the observations acquired via sensors pertaining to the various modalities are tied to a physical location in the environment. These observations, obtained at some location in the past, can be leveraged as prior belief to infer a missing modality at the query location. This mechanism, based on prior belief, is inspired from everyday human behavior. Humans tend to develop beliefs based on experiences that are then used to inform their choices and actions in everyday life. For instance, a person who has operated a car before and comes across a different car can infer the kind of sound it would make if turned on. Here, the visual information modality is enabling inference of the audio modality based on prior belief. A similar framework can be used with the described system and method, with the prior belief associated with spatial location instead of time. The system develops a belief distribution as it observes the environment and employs the belief to infer missing information when required.

Cross-Modal Queries

The described system and method enables inference of correlation via exploitation of the prior belief developed while generating the model. The spatial association of belief is exploited via the variable, X, that is shared among the 4-tuple joint distributions for all modalities. In other words, the correlation between two modalities, $\Lambda_i$ and $\Lambda_j$, can be inferred from the corresponding distributions of $\Lambda_i$ and $\Lambda_j$ over X.

Consider the task of estimating the value of the modality, $\Lambda_i$, at some location, $x_q$, given the value of another modality, $\Lambda_j = \lambda_j$. The _rst step in leveraging prior belief is to obtain the locations in space at which a similar value of $\Lambda_j$ was observed. This is achieved by obtaining the distribution of X over $\Lambda_j$ as $$p_{X|\Lambda_j}(x_q \mid \lambda_j) = \sum_{k=1}^{K} w_k(\lambda_j) \phi\left(x_q; m_k(\lambda_j), \sum_k\right)$$

where $$w_k(\lambda_j) = \frac{\pi_k \phi\left(\lambda_j; \mu_{k\Lambda_j}, \sum_{k\Lambda_j\Lambda_j}\right)}{\sum_{k'=1}^{K} \pi'_k \phi\left(\lambda_j; \mu_{k'\Lambda_j}, \sum_{k'\Lambda_j\Lambda_j}\right)}$$

and $$m_k(\lambda_j) = \mu_{kX} + \sum_{kX\Lambda_j} \sum_{k\Lambda_j\Lambda_j}^{-1} (\lambda_j - \mu_{k\Lambda_j})$$

$$\sigma_k^2 = \sum_{kXX} - \sum_{kX\Lambda_j} \sum_{k\Lambda_j\Lambda_j}^{-1} \sum_{k\Lambda_j X}$$

The set of components, S, that have a non-zero weight for $\Lambda_j = \lambda_j$ is obtained. These components represent regions in the environment where the value of $\Lambda_j \approx \lambda_j$ has been observed. A set of candidate locations, L, is then obtained via calculation of the expected value of X for every component in S.

From the set of locations, L, where $\Lambda_j$ was observed to be close to $\lambda_j$, the location that provides the most relevant prior, $x_p$, is selected via likelihood maximization.

$$x_p = \underset{x \in L}{\operatorname{argmax}} \; p(\lambda_j \mid x)$$

Having obtained the most likely location $x_p$ to be used as a prior, the expected value of $\Lambda_i$ is regressed.

$$E[\Lambda_i = \lambda_i \mid X = x_p] = \sum_{k=1}^{K} w_k(x_p) m_k(x_p)$$

Multiple Priors

The formulation previously shown can be extended to incorporate multiple priors. Information from multiple other sensing modalities is beneficial when inferring the expected value of the target modality, $\Lambda_i$, at some location, $x_q$, where the model for $\Lambda_i$ does not exist or is lesser fidelity than desired. Absence of desired model-fidelity can occur as a consequence of sensor malfunction, high degree of sparsity, or adverse environment conditions.

Let there be J observed information modalities, expressed as $\Lambda_j$, $j \in \{1,J\}$, at the query location, $x_q$. The target modality is $\Lambda_i$, $i \notin \{1,J\}$. To incorporate information from multiple priors, the set of locations, L, is augmented to contain candidate locations based on the models of each of the available modalities, $\Lambda_j$. The most pertinent prior location, $x_q$, is chosen via maximization of the sum of likelihood of the models given L.

$$x_p = \underset{x \in L}{\operatorname{argmax}} \sum_{j=1}^{J} p(\Lambda_j = \lambda_j \mid x)$$

The expected value of $\Lambda_i$ is regressed, as previously shown.

It is important to note that the proposed formulation is naturally able to handle contradictory priors. If two locations are equally relevant to be used as priors, the formulation will arbitrarily elect one of them. This approach aligns with human behavior when confronted with contradicting equal-priority choices.

We claim:

1. A system for creating a model of the environment comprising:
   one or more sensing modalities for obtaining sensor observations of the environment;
   a local model of the environment comprising a hierarchal Gaussian mixture model (HGMM) representing point cloud data, wherein higher levels of the hierarchy have lower fidelity than lower levels of the hierarchy;
   a global model of the environment;
   a processor; and
   software, executed by the processor, for iteratively performing the functions of:
   obtaining the sensor observations and converting the sensor observations to a point cloud;
   determining, for each point in the point cloud, the likelihood that the point can be modelled by the existing local model at a lowest level of fidelity of the local model, based on a novelty threshold; and
   triggering an incremental update of the global model if a predetermined portion of the points in the point cloud fail to meet the novelty threshold, the incremental update comprising:
   merging the local model with the global model; and
   generating a new local model, based on the point-cloud.

2. The system of claim 1 wherein, if the incremental update of the global model is not triggered, then incrementally updating the local model with the point cloud.

3. The system of claim 2 wherein, if the global HGMM is not updated, the local HGMM is updated with the non-novel portion of the incoming point-cloud.

4. The system of claim 3 wherein predictions for the non-novel portion of the point-cloud are obtained from the lowest level of the local HGMM.

5. The system of claim 1 wherein a lowest level of the HGMM is trained using a standard expectation maximization approach over the point-cloud.

6. The system of claim 5 wherein the software performs the further function of creating higher levels of the HGMM by merging similar components on the same level, wherein two components are considered to be similar if their divergence is within a specified similarity threshold.

7. The system of claim 1 wherein higher levels of the HGMM are created until the highest level has a fidelity lower than a fidelity threshold.

8. The system of claim 1 wherein the global model is incrementally updated by merging the current local model with the global model.

9. The system of claim 8 wherein the merging of the local model with the global model comprises concatenation of corresponding levels of the local model and the global model with an adjustment of a weight associated with each of the levels.

10. The system of claim 1 wherein a local model is created for each one of the one or more sensing modalities.

11. The system of claim 10 wherein a missing sensing modality at a given location can be inferred from other available sensing modalities at that location using the association of observations to spatial location.

12. The system of claim 10 wherein prior observations for all sensing modalities can be used as priors to enable cross modal inference and provide robustness to sensing modality malfunction.

13. The system of claim 12 wherein contradicting priors are handled via a selection of the most relevant prior based on a log-likelihood calculation.

14. A method for creating a model of an environment compromising iteratively performing the steps of:
   obtaining sensor observations from one or more sensing modalities and converting the sensor observations to a point-cloud;
   determining, for each point in the point cloud, the likelihood that the point can be modelled by an existing local model of the environment at a lowest level of fidelity of the local model, based on a novelty threshold; and
   triggering an incremental update of a global model of the environment if a predetermined portion of the points in the point cloud fail to meet the novelty threshold, the incremental update comprising:
   merging the local model with the global model; and
   generating a new local model, based on the point-cloud;
   wherein the local model and global model comprise hierarchical Gaussian mixture models representing the point cloud, wherein higher levels of the hierarchy have lower fidelity than lower levels of the hierarchy.

15. The method of claim 14 wherein, if the incremental update of the global model is not triggered, then incrementally updating the local model with the point-cloud currently Amended.

16. The method of claim 15, further comprising:
   creating higher levels of the local model and global model by merging similar components on the same level, wherein two components are considered to be similar if their divergence is within a specified similarity threshold.

17. The method of claim 16 wherein higher levels of the local model and global model are created until the highest level has a fidelity lower than a fidelity threshold.

* * * * *